United States Patent

Chaddha

[15] 3,644,896

[45] Feb. 22, 1972

[54] MODEM CONTROLLER

[72] Inventor: Ashwani K. Chaddha, 83 Brattle Street, Arlington, Mass. 02174

[22] Filed: Mar. 30, 1970

[21] Appl. No.: 23,924

[52] U.S. Cl. .......... 340/172.5
[51] Int. Cl. .......... G06f 3/00, H04j 3/00
[58] Field of Search .......... 340/172.5

[56] References Cited

UNITED STATES PATENTS

| | | | |
|---|---|---|---|
| 3,377,623 | 4/1968 | Reut et al. | 340/172.5 |
| 3,390,379 | 6/1968 | Carlson et al. | 340/172.5 |
| 3,456,242 | 7/1969 | Lubkin et al. | 340/172.5 |
| 3,510,843 | 5/1970 | Bennett et al. | 340/172.5 |
| 3,528,060 | 9/1970 | Streif | 340/172.5 |
| 3,541,513 | 11/1970 | Paterson | 340/172.5 X |

*Primary Examiner*—Paul J. Henon
*Assistant Examiner*—Paul R. Woods
*Attorney*—Cesari and McKenna

[57] ABSTRACT

A data system for handling selectively controlling modems for the transfer of data to and from a plurality of remote, asynchronous data station by way of a serial line multiplexer interfacing with a small-scale data processor or computer. The system responds to the presence of a ring on any one of plural input lines to control the associated modem for the assembly of data characters. The system also operates to control a selected modem for the transmission of data characters over an associated output line to a remote data station.

14 Claims, 4 Drawing Figures

INVENTOR
ASHWANI K. CHADDHA
BY
Cesari and McKenna
ATTORNEYS

INVENTOR
ASHWANI K. CHADDHA
BY
Cesari and McKenna
ATTORNEYS

INVENTOR
ASHWANI K. CHADDHA
BY
Cesari and McKenna
ATTORNEYS

MODEM CONTROLLER

BACKGROUND OF THE INVENTION

The system herein disclosed is contemplated as a supplement to the Data Handling System disclosed in U.S. Pat. No. 3,416,141, issued Dec. 10, 1968 or the Data Communication System disclosed in my copending application, Ser. No. 874,301, filed Nov. 5, 1969. In these systems, input lines over which teleprinter data characters serially arrive are respectively directly connected from individual data stations to a serial line multiplexer interfacing with a small-scale data processor or computer, such as a model PDP-8 or its successor PDP-8/I, manufactured by the Digital Equipment Corporation, Maynard, Massachusetts. A line selection register controlling a gating network is operated to effectively connect each input line to the memory buffer register of the computer in repeating sequence. Each input line is sampled for the presence of a character bit during the moment it is connected to the memory buffer register. After a predetermined number of samplings of an input line during the presence of a character bit, the bit is entered into the memory buffer register for inclusion in a character assembly word held therein. From the memory buffer register, the character assembly word is transferred to a computer memory for storage in a location assigned to the particular input line over which the bit is being transmitted. This process is repeated for each input line, either in succession or in some other order.

Since the time interval between consecutive samplings of any one input line is significantly less than the pulse interval of a character bit transmitted on that line, no bits are lost in spite of the random nature of the character transmissions.

After all of the bits of a transmitted character have been assembled into a character assembly word, the character is transferred to a new memory location also assigned to that input line. When a complete message consisting of a plurality of characters has been received over an input line, the computer is typically programmed to transfer the message at a rapid rate to a central station, which may take the form of a large computer. These transfers are made during intervals between input line samplings so as not to interfere with the assembly of incoming character bits over any of the input lines.

The systems of the above-noted patent and copending application also operate to transmit teleprinter data back to the various individual stations over output lines connected thereto. Such transmission typically originate at the central station and are temporarily stored in the computer memory until such time as they can be transmitted to the individual station during those times when the system is not otherwise occupied with sampling for incoming data. Each character to be transmitted is transferred in sequence from the computer memory to an accumulator register from which the individual bits are shifted for serial bit transmission to the appropriate data station at a suitable baud rate.

For a more detailed description of these systems, specific reference should be had to the above-noted patent and copending application, whose disclosures are specifically incorporated herein by reference.

The instant invention is specifically adapted as a supplement to the data communication system disclosed in the above-noted copending application, thereby implementing it to handle data transmissions to and from remote asynchronous data stations connectable through exchanges to Bell System data set modems or equivalent devices. For example, the system of the present invention operates to control a plurality of modems, such as Bell System series 103 modems, to establish communication with remote data stations, with teleprinter character transmissions being handled in the manner disclosed in the above noted patent or copending application.

SUMMARY OF THE INVENTION

In accordance with the present invention, a system is provided for controlling a plurality of asynchronous modems for data exchanges between a data handling system and a plurality of remote data stations connectable to individual modems. The modem controller, which is a part of the overall data handling system, includes a ring scanner operating to sample each of the modems in repeated sequence for the presence of a ring signal signifying that a remote data station wishes to transmit to the data handling system. When the ring scanner indexes to the modem associated with an input line over which a ring signal is received, a ring flag signal is generated and the ring scanner is halted. The ring flag signal is transmitted to a data processor or computer included in the data handling system, as an interrupt request inquiring whether the system can handle a forthcoming data transmission from the particular remote data station. The computer determines which modem is responsible for the ring and conditions it to turn on its carrier. Ring scanning is then resumed.

A carrier scanner included in the modem control system samples each modem in repeating sequence for carrier changes, i.e., carrier comes on or goes off. When the carrier scanner indexes to a modem whose carrier has just been turned on, carrier scanning is halted and a carrier flag signal is generated to the computer as an interrupt request. The computer determines which modem is responsible for the carrier flag signal and then causes carrier scanning to resume. Data transmissions from the modem to the data handling system are carried out in the manner described in the above-noted patent and copending application.

As an important feature of the invention, the ring and carrier scanners are in the form of multistage registers or counters which are indexed by separate stepping pulses. Each modem sampling is accomplished by decoding the contents of these registers to select, through suitable gating networks, the modems for ring and carrier samplings. Thus, to determine which of the modems is responsible for a ring or carrier flag, the computer need only read out the contents of either the ring or carrier scanner register, as the case may be.

When the data handling system desires to transmit data over an output line connected to a particular modem, the computer program causes the number of the modem to be transferred to a register in the modem controller. This number is decoded and used to enable instruction gates in a modem control module associated with the particular modem. The computer then generates an instruction effective to cause the appropriate modem to turn on its carrier. When the carrier scanner indexes to this modem, a carrier flag is generated, carrier scanning is halted, and the resulting interrupt request is communicated to the computer. The computer then reads the modem number from the carrier scanner to determine that the correct modem has responded. Carrier scanning is then resumed. The data handling system begins transmitting data to the particular modem and over the output line connected thereto. These data transmissions are preferably carried out in the manner disclosed in the above-noted patent and copending application.

The modem controller of the invention may also be controlled to index through the array of modems and determine the carrier status, on or off, of each.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

DETAILED DESCRIPTION

Figure 1:
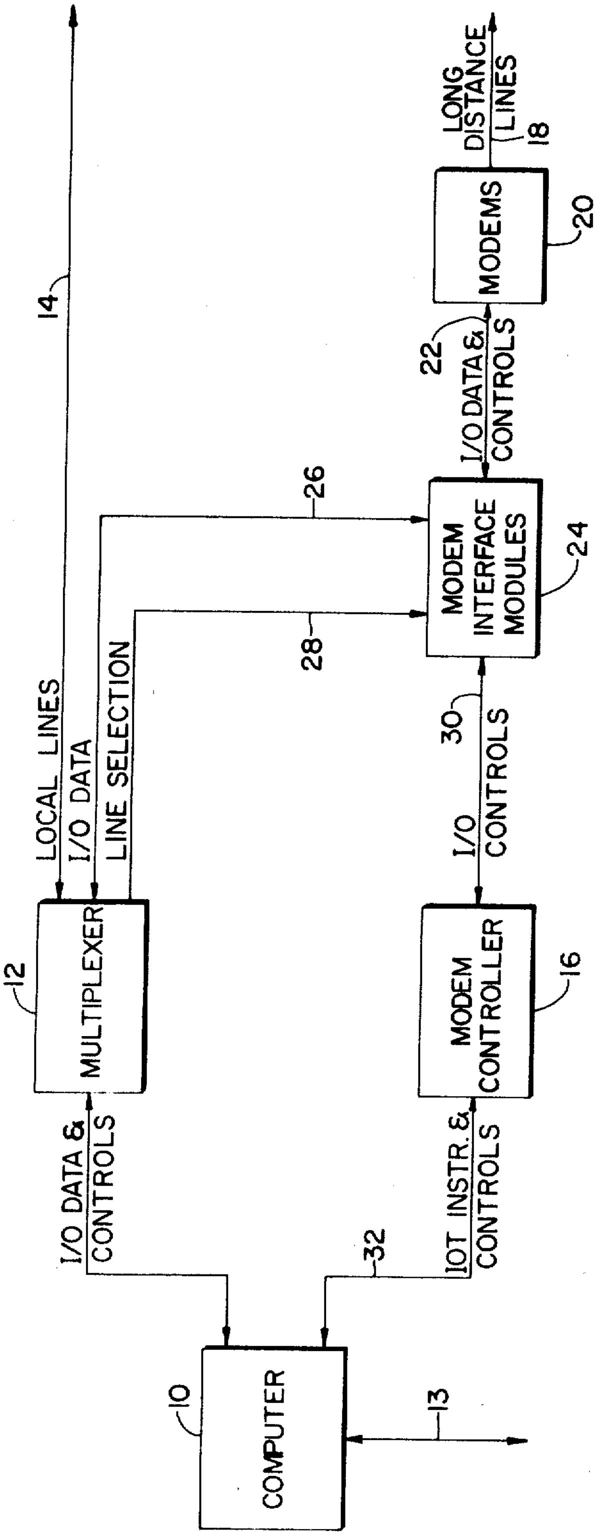
FIG. 1 is an overall block diagram of a data handling system incorporating the modem controller of the present invention.

The data handling system shown in FIG. 1 includes a computer 10 and a multiplexer 12 to which a plurality of input and output local lines 14 are connected. The local lines 14 provide full-duplex, direct communication links with a plurality of individual data stations, not shown. The computer 10 and multiplexer 12 together constitute a data handling system, such as disclosed in my above-noted copending application, Ser. No. 874,301.

The computer 10 is linked to a central station (not shown) over connections 13. The multiplexer 12 operates to sample all of the input local lines in repeating sequence for teleprinter character transmissions which are of an asynchronous and random nature. The computer memory stores an input instruction, a line status word, and a character assembly word associated with each input line. Each input line is sampled at a predetermined rate, such as five times the baud rate of the data transmissions thereover. A sampling cycle is initiated by a clock pulse, whereupon the system proceeds to successively retrieve the input instructions for all of the input lines assigned to that particular clock. After the instruction of a particular input line has been retrieved from the computer memory and decoded to determine that an input sampling is to be performed, the line status word for that line is retrieved from the memory. The line status word includes a status bit indicating whether the associated input line was active or inactive when last sampled, the line number of the associated input line, and a count word which is incremented during each sampling of that line during a character transmission to determine the optimum time in which to accept for character assembly a character bit being transmitted. When a character bit is to be assembled, the appropriate character assembly word is retrieved from the memory and the character bit being transmitted is assembled therein.

When it is desired to transmit data from the computer over a selected one of the local output lines by way of the multiplexer 12, the output line is selected and the character to be transmitted thereover is retrieved from the computer memory. One character bit is transmitted over the selected line and the remainder of the character is returned to the computer memory to await the next output cycle during which the process is repeated in order to transmit the next character bit. The output lines are selected for transmissions in a manner such that the interval between output cycles for any particular output line corresponds to the acceptable baud rate of the data station receiving the transmission.

The modem controller of the present invention, indicated at 16, adapts the data handling system of FIG. 1 to carry on data exchanges with remote data stations connectable thereto through exchanges and long distance input and output lines, indicated at 18. At each end of each input and output long distance line pair is a modem, which is essentially a modulator-demodulator for handling carrier modulated binary data transmissions. The modems at the data handling system end of the long distance lines 18, indicated at 20, are separately connected over connections 22 to individual modem interface modules 24. The modem interface modules 24 are essentially converters for converting the levels of control and data signals exchanged by the modems and the data handling system in accordance with Electronic Industries Association standards.

The modem interface modules 24 are coupled to the multiplexer 12 by connection 26 over which input data is transferred to the multiplexer for character assembly and output data is transferred to selected modems 20 for transmission. Connection 28 from the multiplexer 12 applies line selection inputs to the various modem interface modules 24 for selecting specific modems 20 for data character assembly and transmission.

While data exchanges between the computer 10 and the various modems 20 are carried out exclusively by way of the multiplexer 12, control of the modems is performed by the modem controller 16 over connections 30 between it and the modem interface modules 24 in response to program instructions and controls coupled between the controller and the computer 10 over connections 32.

Figure 2:
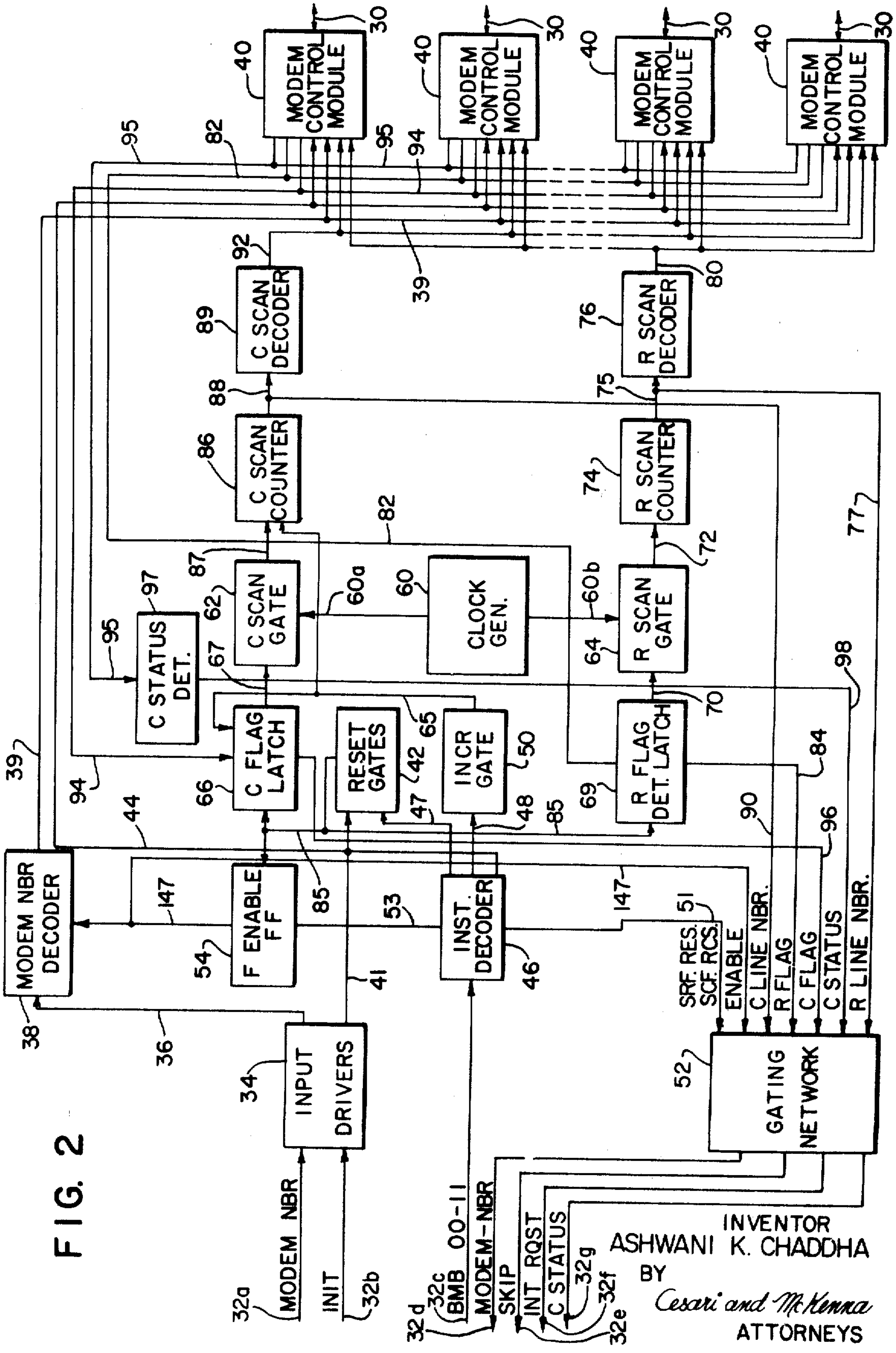
FIG. 2 is a detailed block diagram of the modem controller of FIG. 1.

The modem controller 16 is shown in more detail in FIG. 2. Of connections 32 between the computer 10 and the modem controller 16, connection 32*a* includes a series of parallel leads originating from a suitable register in the computer 10, such as the accumulator. Leads 32*a* are applied to driver circuits 34 and the corresponding outputs are supplied over leads 36 to a modem number(NBR) decoder 38. As will be seen, connection 32*a* supplies a modem number which is decoded to address, over a set of connections 39, one of a plurality of modem control modules 40 connected to the particular modem selected by the computer 10.

An initialization command INIT is supplied over connection 32*b* to input drivers 34. This initialization command is supplied over connection 41 to a series of reset gates 42 and over connections 44 to each of the modem control modules 40. This INIT command is used to clear the modem controller 16 when such is desired, as when the controller starts operation.

Figure 4:
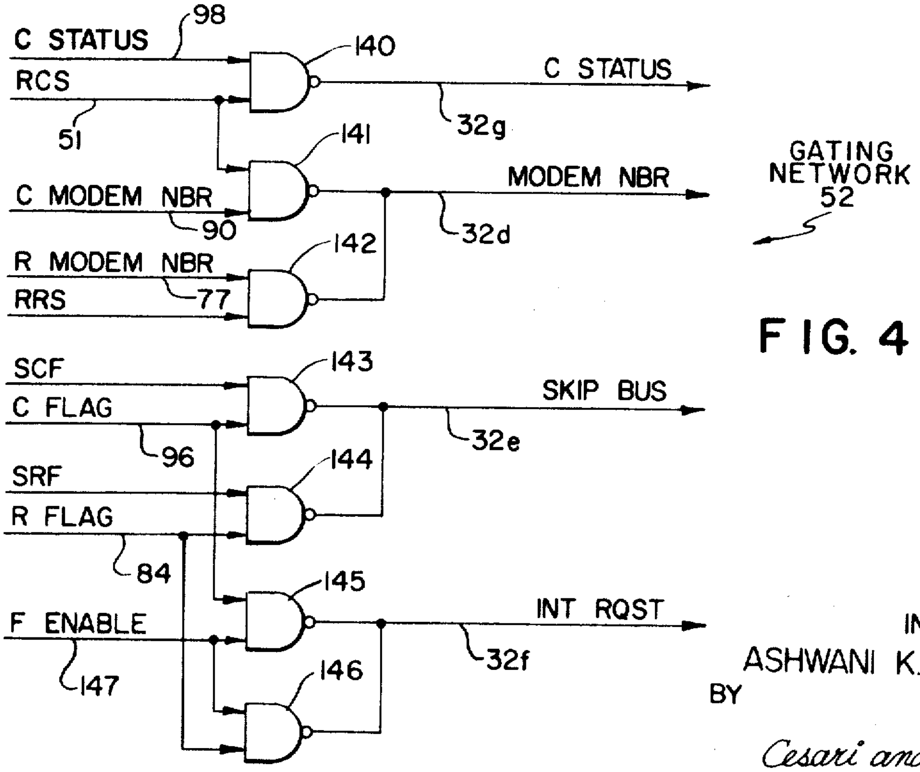
FIG. 4 is a logic block diagram of the gating network included in the modem controller of FIG. 2.

The various instructions generated by the computer program are supplied over connection 32*c* from the computer memory buffer register to an instruction decoder 46. As will be seen, some of the computer program instructions are supplied over connection 47 to the reset gates 42, over connections 44 to the modem control modules 40, over connection 48 to an increment gate 50, over connection 51 to a gating network 52 and over connection 53 to enable flip-flop 54. As is seen in FIG. 4, gating network 52 has other inputs, as well as outputs over connections 32*d*, 32*e*, 32*f* and 32*g* leading to the computer 10.

Still referring to FIG. 2, a clock pulse generator 60 provides separate clock pulse outputs on leads 60*a* and 60*b* at a suitable rate, such as 1,200 Hz., to a carrier scan gate 62 and a ring scan gate 64. Carrier scan gate 62 is controlled either from the increment gate 50 over lead 65 or a carrier flag detector and latch 66 over lead 67. The ring scan gate 64 is controlled by a ring flag detector and latch 69 over lead 70.

Clock pulses passed by the ring scan gate 64 are supplied over output lead 72 to increment a ring scan counter 74. The ring scan counter consists of a number of flip-flop stages sufficient to count up to the number of modems being controlled by the controller 16. For example, the ring scan counter 74 may be provided with seven stages enabling the controller to handle 128 asynchronous modems. The content of the ring scan counter 74 is supplied over a connection 75 to a ring scan decoder 76 and also over connection 77 to the gating network 52. The ring scan decoder 76 decodes the count content of the ring scan counter 74 and provides discrete outputs over a set of connections 80 to the respective modem control modules 40.

Figure 3:
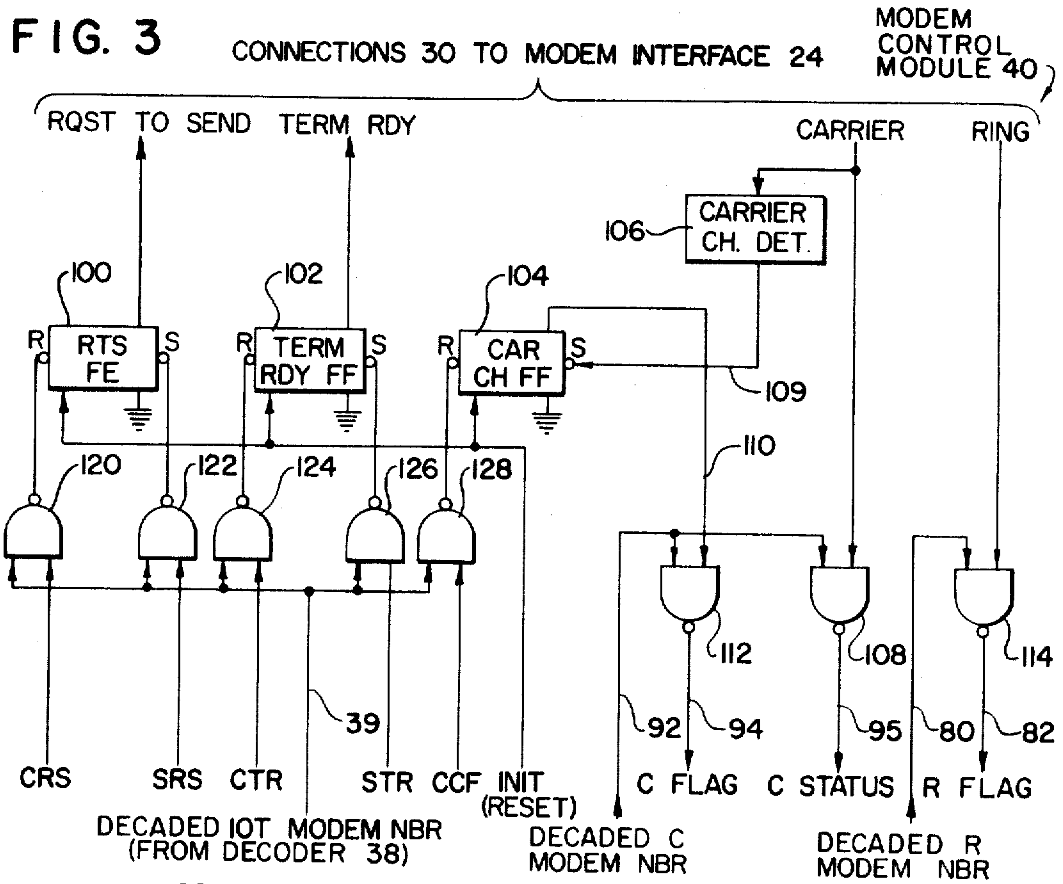
FIG. 3 is a logic block diagram of one of the modem control modules incorporated in the modem controller of FIG. 2.

As will be seen in FIG. 3, this decoded output is effective to qualify a gate 114 in the modem control module 40 connected to the particular modem designated by the count content of the ring scan counter 74. This selects one of the modems to sample for the presence of a ring signal. As the ring scan counter 74 is indexed, the modems are sampled for rings in corresponding sequence. If a ring signal is present when a modem is sampled, the qualified gate in the associated modem control module 40 passes a ring flag output signal onto a common lead 82 connected to the ring flag detector and latch circuit 69. The ring flag detector and latch circuit 69 is a bistable circuit which is triggered to a set condition in response to a ring flag output on lead 82. The circuit 69 thus provides an output on lead 70 disabling the ring scan gate 64 to temporarily interrupt ring scanning. The ring flag detector and latch circuit also provides a ring flag output over lead 84 to the gating network 52. This circuit 69 is later reset from the reset gates 42 over connection 85, thus again enabling ring scan gate 64 so that ring scanning can resume.

In the corresponding manner, clock pulses from the clock generator 60 are passed by the carrier scan gate 62, when enabled by the carrier flag detector and latch circuit 66 or the increment gate 50, to a carrier scan counter 86 over lead 87.

The carrier scan counter is constructed in the same manner as the ring scan counter 74. The count content of the carrier scan counter is applied over connection 88 to a carrier scan decoder 89 and over connection 90 to the gating network 52. The decoded outputs of the count content of the carrier scan counter 86, on a set of connections 92, are applied to each of the modem control modules 40.

As will be seen in FIG. 3, a pair of gates 108 and 112 included in the modem control module connected to the selected modem are enabled by the decoded outputs on connections 92. One of these gates passes a carrier flag signal onto lead 94, common to all modem control modules, if there has been a carrier change at this modem since it was last sampled. The other gate in the addressed modem control module passes a carrier status signal C STATUS onto lead 95 indicative of whether the carrier of the selected modem is presently on or off.

A carrier flag output signal on lead 94 is coupled to the carrier flag detector and latch circuit 66, corresponding to the ring flag detector and latch circuit 69. If there has been a carrier change, the resulting carrier flag triggers the carrier flag detector and latch circuit to a set condition effective to disable the carrier scan gate 62 over output lead 67. Carrier scanning is temporarily halted. This carrier flag circuit 66 also supplies a carrier flag output signal to the gating network 52 over lead 96 and is reset by the reset gates 42 over lead 85 to permit the resumption of carrier scanning. The carrier status output on lead 95 is supplied to a carrier status detector 97 whose output, indicative of the present carrier status of the selected modem, is passed over lead 98 to the gating network 52.

Each modem control module 40, as seen in FIG. 3, includes a Request-To-Send flip-flop 100, a Terminal-Ready flip-flop 102, and a Carrier-Change flip-flop 104. The set outputs of the Request-To-Send flip-flop 100 and the Terminal-Ready flip-flop 102 in each modem control module 40 are individually connected to a different one of the modems 20 by way of the modem interface 24. A carrier signal originating at one of the modems 20 is supplied through modem interface 24 to a carrier change detector 106 and to one input of the gate 108 included in the associated modem control module 40. The output of the carrier change detector 106 on lead 109 triggers the Carrier-Change flip-flop 104 to its set position in response to any change in the carrier signal level, as occurs when the carrier goes from on to off or from off to on. The set output of the Carrier-Change flip-flop 104 is supplied over lead 110 to one input of a coincidence gate 112. As noted above, gates 108 and 112 are enabled by a discrete output from carrier scan decoder 89 (FIG. 2) occurring when the carrier scan counter 86 is indexed to the modem number assigned to the modem associated with that control module 40. Gate 108 provides an output C STATUS on lead 95 indicative of the carrier status, i.e., whether on or off, of the particular modem addressed by the carrier scan counter 86. Gate 112 provides a carrier flag output C FLAG if the Carrier-Change flip-flop 104 has been set in response to a change in the carrier status since this modem was last sampled.

Similarly, a ring signal from any modem is supplied through modem interface 24 to the modem control module 40 associated with the modem. Specifically, the ring signal is applied to the coincidence gate 114. This gate 114 is enabled to pass a ring flag output R FLAG onto lead 82 when the particular modem responsible for the ring signal is addressed by the ring scan counter 74 over one of the connections 80.

The conditions of Request-To-Send flip-flop 100 and Terminal-Ready flip-flop 102 are controlled in response to computer program instructions supplied over connection 32c (FIG. 2) to the instruction decoder 46, and thence to the modem control modules over connections 44. The Carrier-Change flip-flop 104 is reset by program instructions. These instructions to be described are supplied over the connections 44 to all of the modem control modules for the purpose of appropriately conditioning the flip-flops 100, 102 and 104 of the modem control module addressed by the computer by way of the modem number decoder 38 (FIG. 2). However, the initialization instruction INIT is addressed to all modem control modules for the purpose of resetting the flip-flops 100, 102 and 104 in each.

As seen in FIG. 3, an instruction CRS (Clear Request-To-send flip-flop) is supplied to an input of a coincidence gate 120. An instruction SRS (Set Request-To-Send flip-flop) is applied to one input of a coincidence gate 122. An instruction CTR (Clear Terminal-Ready flip-flop) is supplied to one input of coincidence gate 124 while instruciton STR (Set Terminal-Ready flip-flop) is supplied to one input of coincidence gate 126. Program instruction CCF (Clear Carrier-Change flip-flop) is applied as one input of coincidence gate 128.

These gates are commonly enabled such that flip-flops 100, 102 and 104 of only one modem control module can respond to these instructions when a particular modem is addressed from the computer by way of the modem number decoder 38 and one of the connections 39. That is, when the computer addresses a particular modem, only the modem control module 40 associated therewith receives an enabling input for coincidence gates 120, 122, 124, 126 and 128. The output of gate 120 is connected to the reset input of Request-To-Send flip-flop 100 while the output of gate 122 is connected to the set input thereof. Thus, instruction CRS causes flip-flop 100 in the addressed modem control module to be cleared or reset, while instruction SRS causes this flip-flop to be set. Similarly, the Terminal-Ready flip-flop 102 is reset from the output of gate 124 by the instruction CTR and set from the output of gate 126 by the instruction STR. The Carrier-Change flip-flop 104 is cleared or reset from the output of gate 128 by the instruction CCF.

Referring now to FIG. 4, the gating network 52 shown in FIG. 2 includes a series of coincidence gates 140 through 146. The C STATUS input to gating network 52 on lead 98 is applied to one input of coincidence gate 140. A computer program instruction RCS (Read Carrier Scanner) is supplied over one of the connections 51 from instruction decoder 46 to the other input of coincidence gate 140 and to one input of coincidence gate 141. The other input to gate 141 is the carrier modem number supplied from the carrier scan counter 86 over connection 90. It will be appreciated that the gate 141 in practice is constituted by a set of coincidence gates each receiving the instruction RCS as one input and the other the output of a different stage of the carrier scan counter 86. The binary coded modem number is supplied in parallel from the outputs of these coincidence gates 141 to the computer over connections 32d indicated in FIG. 2. The output of coincidence gate 140 is supplied to the computer over a separate connection 32g as a C STATUS signal designating the current status of the modem being sampled by the carrier scan counter 86. As will be seen, the computer, in response to the receipt of a carrier flag output C FLAG issues instruction RCS to enable coincidence gates 140 and 141. As a result, the computer is supplied with the current carrier status and the number of the modem causing the carrier flag output.

Coincidence gate 142, like gate 141, is in practice a series of gates each receiving as one input the output of a different stage of the ring scan counter 74 supplied to the gating network 52 over connection 77. As will be seen, the computer operates in response to the receipt of a ring flag output R FLAG to issue an instruction RRS (Read Ring Scanner) to enable coincidence gate 142 and thereby pass the number of the modem responsible for the ring to the computer over connections 32d.

Still referring to FIG. 4, a carrier flag output C FLAG supplied to the gating network 52 over connection 96 is applied to one input of coincidence gate 143 and also one input of coincidence gate 145. A ring flag output R FLAG on lead 84 connected to the gating network 52 is applied as one input to coincidence gate 144 and coincidence gate 146. The other input to coincidence gates 145 and 146 is supplied by the set output of the F ENABLE flip-flop 54 supplied to the gating network 52 over lead 147 (FIG. 2). The other input to coincidence gate 143 is a computer program instruction SCF (Skip On Carrier Flag) while the second input to coincidence gate 144 is instruction SRS (Skip On Ring Flag).

As will be described in more detail, when a ring flag R FLAG or carrier flag C FLAG comes up, assuming that the F ENABLE flip-flop 54 is set, an interrupt request INT RQST is supplied from the output of either coincidence gate 145 or 146 over connection **32*f* to the computer 10. Among other things, the computer, in response to an interrupt request INT RQST, successively issues the instructions SCF and SRS, which are decoded in the instruction decoder 46 and supplied over separate connections 51 to the gating network 52 in order to determine which flag, ring or carrier, has come up. For example, if a carrier flag C FLAG has come up and the computer first issues the instruction SRF, no output on skip bus connection 32*e* is received by the computer, since neither gate 143 or 144 is enabled. However, when the computer issues instruction SCF, coincidence gate 143 is fully enabled and the computer receives an output on lead 32*e* designating that a carrier flag C FLAG has caused the interrupt request INT RQST. It will be appreciated that the computer 10** will typically entertain many different types of interrupt requests, some possibly wholly unconnected with the operation of the data handling system. Thus, when an interrupt request is received by the computer, it will normally issue a whole series of instructions in an effort to determine the nature of the interrupt request. Once this is done, the computer makes the decision as to whether it is able to handle the specific request at that time or come back to it at some later time.

The modem controller 16 (FIG. 1) provides hardware to operate in conjunction with the computer 10 and multiplexer 12 for the purpose of controlling teleprinter data character exchanges between the computer and the various asynchronous modems 20 by way of the multiplexer. It will be appreciated that the computer may be programmed in a variety of ways so as to vary the control of the modems exerted by the modem controller 16 to suit a particular user's requirements.

As an example of the manner of which the modem controller is operated, data transfers from the computer 10 to a selected modem for transmission over the output line connected thereto may be controlled as follows. The computer program issues the number of the modem connected with the output line over which a data transmission is to be effected. This modem number is retrieved from the computer memory and then supplied over connections **32*a* to the modem number decoder 38 by way of the input drivers 34. The modem number is decoded to provide a discrete output on one of the connections 39 leading to the particular modem control module 40 concerned. As a result, instruction coincidence gates 120, 122, 124, 126 and 128 in this modem control module are enabled (FIG. 3). The computer program then issues instruction SRS, which is effective to set the Request-To-Send flip-flop 100 in the addressed modem control module. Flip-flop 100, when set, transmits a RQST-TO-SEND signal to the modem connected thereto. In response, this modem turns on its carrier. The carrier change detector 106 in the associated modem control module responds to this carrier change by setting the Carrier-Change flip-flop 104. When the carrier scan counter 86, which all the while has been indexing from modem to modem, steps to the particular modem addressed by the computer, gates 112 and 108 are enabled, resulting in outputs C FLAG and C STATUS. The carrier flag output C FLAG on lead 94 conditions the carrier flag detector and latch 66, which then operates to disable the carrier scan gate 62 to halt carrier scanning and also supply the carrier flag output C FLAG over lead 96 to the gating network 52 (FIG. 2). Similarly, the carrier status output C STATUS is also supplied to the gating network 52 by way of lead 95, carrier status detector 97, and lead 98**.

Assuming that the F Enable flip-flop 54 is set, gate 145 in the gating network 52 (FIG. 4) passes an interrupt request INT RQST over connection **32*f* to the computer 10. The computer then issues a series of sequential skip instructions including SRF (Skip On Ring Flag) and SCF (Skip On Carrier Flag). When instruction SCF issues, gate 143 is enabled to supply a skip output on connection 32*e*** to the computer which then knows a carrier flag was responsible for the interrupt request.

The computer then issues instruction RCS (Read Carrier Scanner) and the modem number in the carrier scan counter 86 is supplied from the gating network 52 to the computer over connections **32*d* while the carrier status C STATUS is obtained by the computer over connection 32*g*. In this manner, the computer can determine that the appropriate modem responded and that its carrier has been turned on. This modem may then be added to the list of local output lines and other modems which are to handle data transmission from the computer 10 at the time alloted for data transmissions. Those modems included in the data output list are successively selected by way of connections 28 and receive the data to be transmitted over connections 26, both leading from the multiplexer 12 (FIG. 1**).

Meanwhile, the computer program issues an instruction CCF (Clear Carrier Flag). This causes the reset gates 42 to reset the carrier flag detector and latch 66 over lead 97. Latch 66 thereupon enables the carrier scan gate 62 and carrier canning resumes. Instruction CCF also clears Carrier-Change flip-flop 104 through gate 128 in the addressed modem control module (FIG. 3). The computer then issues instruction CRS to clear the Request-To-Send flip-flop 100 in the addressed modem control module.

Carrier-Change flip-flop 104 is thus conditioned to respond to any dropout of the modem's carrier during the time it is involved in data transmission. Should this occur, the computer must be advised of this fact since, without a carrier, no data can be transmitted. It is seen that if the carrier does turn off inadvertently, a carrier flag output causes an interrupt request to the computer when the carrier scanner steps to that particular modem. The computer then issues instruction RCS to determine the number and carrier status of the modem whose carrier has dropped out and terminate the transfer of data thereto.

When a remote terminal dials into the data handling system, the ringing signal on an input line is sensed by the modem connected therewith. A ring signal from the modem is applied to coincidence gate 114 of the associated modem control module 40. When the ring scan counter 36 indexes to this modem, gate 114 generates a ring flag output R FLAG. The ring flag detector and latch 69 responds by disabling the ring scan gate 64 to halt ring scanning and supplying ring flag output R FLAG to the gating network 52, causing an interrupt request INT RQST to the computer. The computer issues instructions SCF and SRF in sequence to determine that a ring flag is responsible for the interrupt request. The computer then issues instruction RRS (Read Ring Scanner) and the number of the modem connected to the ringing line is supplied to the computer via the ring scan counter 74 and gating network 52. Instruction CRF (Clear Ring Flag) is then issued to the reset gates 42 which operate to clear the ring flag detector and latch 69, enabling the ring scan gate 64 so that the ring scanning can resume.

The computer program then addresses the modem control module associated with the modem responsible for the ring flag by way of decoder 38. Instruction STR (Set Terminal-Ready flip-flop) issues to set flip-flop 102 through gate 124 in the addressed modem control module. The set output of Terminal-Ready flip-flop 102 causes the associated modem to turn on its carrier. This causes the Carrier-Change flip-flop 104 to be set, resulting in a carrier flag output when the carrier scan counter 86 steps to this modem. In the manner already described, the computer determines the number of the modem responsible for the carrier flag and then carrier scanning is resumed. Instructions CTR (Clear Terminal-Ready flip-flop) and CCF (Clear Carrier-Change flip-flop) issue to reset flip-flops 102 and 104 in the addressed modem control module. In the meantime, the number of this modem is added to the list of local input lines and other modems which are to be sampled in repeating sequence for the presence of incoming character bits pursuant to character assembly.

If desired, the modem controller 16 may be controlled so as to sequence through all of the modems and provide the computer 10 with the current carrier status of each modem. To achieve this, the computer issues an instruction DDF (Disable Modem Interrupt), which is supplied by the instruction decoder 46 to the increment gate 50 over lead 48 and to the reset gates 42 over lead 47. The reset gates 42 respond by clearing the enable flip-flop 54, thereby inhibiting the transfer of interrupt requests INT RQST to the computer. Also the F Enable flip-flop 54 disables the modem number decoder 38 over lead 147 so that the flip-flops 100, 102, and 104 in the various modem control modules cannot respond to instructions from the computer. Increment gate 50, in response to instruction DDF, provides an output pulse on lead 65 to increment the counter 86. The same pulse on lead 65 conditions the carrier flag detector and latch 66 so as to inhibit the carrier scan gate 62, thereby preventing clock pulses from the clock 60 from being passed to the carrier scan counter 86. The modem number in the counter 86 is decoded to enable the coincidence gate 108 in the modem control module associated with the designated modem. The resulting output C STATUS is supplied over lead 95, carrier status detector 97, and lead 98 to the gating network 52. Any carrier flag outputs do not result in an interrupt request since the enable flip-flop 54 is cleared. The computer then issues the instruction RCS and receives the addressed modem's carrier status and number via the gating network 52 and connections **32*d* and 32*g*. The computer then issues another instruction DDF, and the operation is repeated to index the carrier scan counter 86 another count. Another RCS instruction supplies the computer with the carrier status and number of the next modem in sequence. Thus, instructions DDF and RCS, issued in repeating sequence, cause the modem controller 16 to index through the entire array of modems to determine the carrier status of each. If desired, the instructions DDF and RCS may be microprogrammed into a single instruction which causes the carrier scan counter 86** to be indexed one count and the number and carrier status of a modem is transferred to the computer each time it issues.

When it is desired to return to normal operation, an instruction EDF (Enable Modem Interrupt) is issued by the computer to set the F flip-flop 54.

It will thus be seen that the objects of the invention are efficiently attained and, since certain changes may be made in the above construction without departing from the scope of the invention, it is intended that all the matter contained in the above description or shown in the accompanying drawings shall be interpreted as illustrative and not in a limiting sense.

Having described my invention, what I claim as new and desire to secure by Letters Patent is:

1. A controller for use with a data handling system including a plurality of asynchronous modems for transferring data to or from data devices and for generating at least ring and carrier signals, said controller operable with the modems and comprising:

A. a control module connected to each modem and including
   i. means for generating a ring flag signal when a ring sampled modem is receiving a ring signal, and
   ii. means for generating a carrier flag signal when a carrier sample modem's carrier signal changes status during successive samples;

B. a ring scanner connected to said control modules and operating to sample each modem in repeating sequence for a ring signal on an input line connected to thereto;

C. a carrier scanner connected to said control modules operating to sample each modem in repeating sequence for a change in the modem carrier signal status during successive samples; and D. separate means operating in response to carrier and ring flag signals to temporarily halt said carrier and ring scanners, respectively, in order to enable the data handling system to determine the identity of the modems responsible for a carrier status change in a ring signal, respectively.

2. The controller defined in claim 1, wherein 1. said ring scanner includes
   a. a ring scan counter incremented by clock pulses, and
   b. a decoder connected to decode the successive count contents of said ring scan counter and accordingly select successive ones of the modems for ring sampling, and
2. said carrier scanner includes
   a. a carrier scan counter incremented by clock pulses, and
   b. a decoder connected to decode the successive count contents of said carrier scan counter and accordingly select successive ones of the modems for carrier sampling.

3. The controller defined in claim 1 wherein said ring scanner and carrier scanner have independently operable sequences whereby said scanners operate independently of each other.

4. The controller defined in claim 2, wherein a. said ring scanner further includes a ring scan gate connected to pass clock pulses to said ring scan counter under the control of said ring flag signal responsive means, and b. said carrier scanner further includes a carrier scan gate connected to pass clock pulses to said carrier scan counter under the control of said carrier flag signal responsive means.

5. The controller defined in claim 1, wherein said data handling system additionally includes means for generating commands and each said control module further includes:

1. means generating a carrier status signal indicative of the carrier signal status of a modem at the time it is carrier sampled,
   a. said carrier status signals being transmitted to the data handling system in response to one of the commands.

6. The controller defined in claim 1, wherein said data handling system additionally includes means for generating address words and instructions, said controller further includes A. means accepting and decoding address words from the data handling system addressing individual ones of the modems; and B. gating means in each said control module separately enabled by said address word means to pass instructions from the data handling system for conditioning an addressed modem to handle a data transmission.

7. The controller defined in claim 2, wherein said data handling system additionally includes means for generating commands and which further includes A. a gating network comprising
   1. gating means for passing ring and carrier flag signals to the data handling system selectively, and
   2. means responsive to commands from the data handling system for enabling said gating means to pass the contents of said ring and carrier scanning counters to the data handling system for identifying the modems responsible for ring and carrier flag signals, respectively.

8. A controller for use with a data handling system including a plurality of asynchronous modems for transferring data to or from data devices and for generating at least ring and carrier signals, said controller operable with the modems and comprising:

A. a ring scanner operating to sample each modem in repeating sequence;

B. a carrier scanner operating independently of said ring scanner to sample each modem in repeating sequence;

C. ring flag signal means associated with each modem for generating a ring flag signal when a modem sampled by said ring scanner is receiving a ring signal on an input line connected thereto;

D. carrier status signal means for each modem for providing successive carrier status signals indicative of the current carrier signal status of each modem as sampled by said carrier scanner;

E. carrier flag signal means for each modem for generating a carrier flag signal when a sample modem's carrier signal changes status during successive sampling by said carrier scanner;

F. ring enabling means operating in conjunction with said ring scanner in response to each ring flag signal to enable the data handling system to determine the identity of the modems receiving ring signals; and G. carrier status enabling means operating in conjunction with said carrier scanner in response to each carrier flag signal to enable the data handling system to determine the current carrier status and the indentity of those modems responsible for said carrier flag signals.

9. The controller defined in claim 8, wherein said controller additionally includes means for generating clock pulses and 1. said ring scanner includes
   a. a ring scanner counter incremented by the clock pulses, and
   b. a ring scan decoder connected to decode the successive count contents of said ring scanner counter and accordingly select successive modems for ring sampling by setting said respectively associated ring flag signal means to a first state, and
2. said carrier scanner includes
   a. a carrier scan counter incremented by the clock pulses, and
   b. a carrier scan decoder connected to decode the successive count contents of said carrier scan counter and accordingly select successive modems for carrier sampling by setting said respectively associated carrier flag signal means to a first state.

10. The controller defined in claim 9, which further includes:

A. a gating network connected to receive said ring and carrier flag signals, outputs according to the contents of said ring and carrier scan counters and carrier status signals, said gating network including:
   1. means for transmitting said ring and carrier flag signals to the data handling system,
   2. means for responding to an instruction from the data handling system to transmit said output of said ring scan counter to the data handling system identifying a modem responsible for a ring flag signal, and
   3. means for responding to an instruction from said data handling system to transmit the carrier status signal and said output of said carrier scan counter identifying the modem responsible for a carrier flag signal and indicating the current carrier status thereof.

11. The controller defined in claim 10 wherein 1. said ring enabling means includes (a) means responsive to each ring flag signal to halt said ring scan counter, and (b) means responsive to an instruction from the data handling system to restart said ring scan counter after the data handling system has identified the modem responsible for a ring flag signal, and
2. said carrier status enabling means includes (a) means responsive to each carrier flag signal to halt said carrier scan counter, and (b) means responsive to an instruction from the data handling system to restart said carrier scan counter after the data handling system has identified and determined the carrier status of the modem responsible for a carrier flag signal.

12. The controller defined in claim 10, which further includes

A. an enable circuit including means responsive to an instruction from the data handling system to inhibit said gating network from passing ring and carrier flag signals to the data handling system; and B. an increment circuit responsive to successive instructions from the data handling system to increment said carrier scan counter one count for each such instruction,
   1. said gating network including means for passing the successive carrier status signals and carrier scan counter outputs to the data handling system.

13. The controller defined in claim 8, which further includes

A. an address decoder connected to receive modem selection addresses from the data handling system, and B. instruction gates associated with each modem and addressed by said address decoder to pass instructions from the data handling system for enabling a selected modem to handle data transmissions.

14. The controller defined in claim 8, wherein the data handling system includes 1. a programmed digital computer for controlling the operation of the modem controller, and
2. a serial line multiplexer for handling data transfers between the computer and the various modems.

* * * * *